Jan. 2, 1951     W. E. CELLWORK     2,536,263
TUNNEL DRAIN CONSTRUCTION ON SEMITRAILER TANKS
Filed Aug. 21, 1944     3 Sheets-Sheet 1
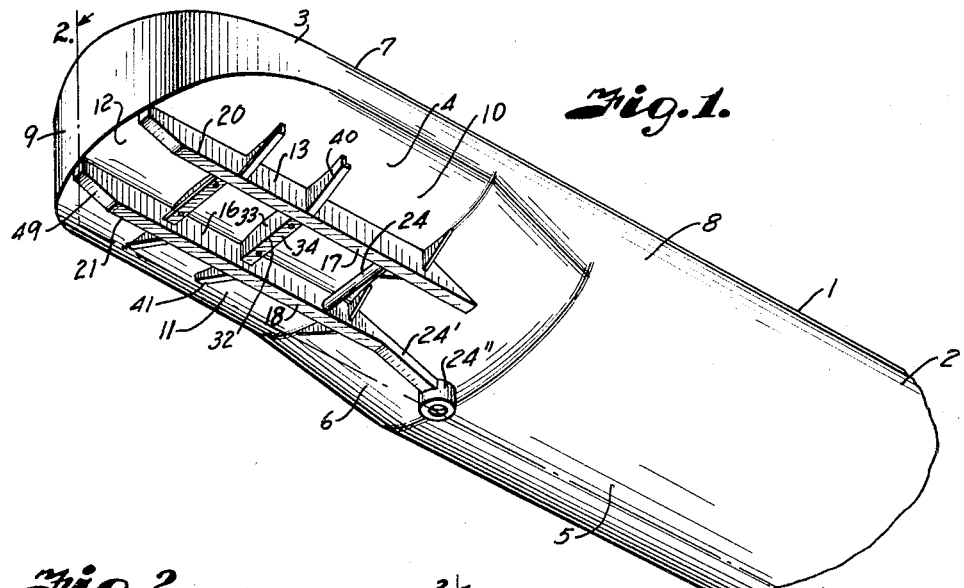
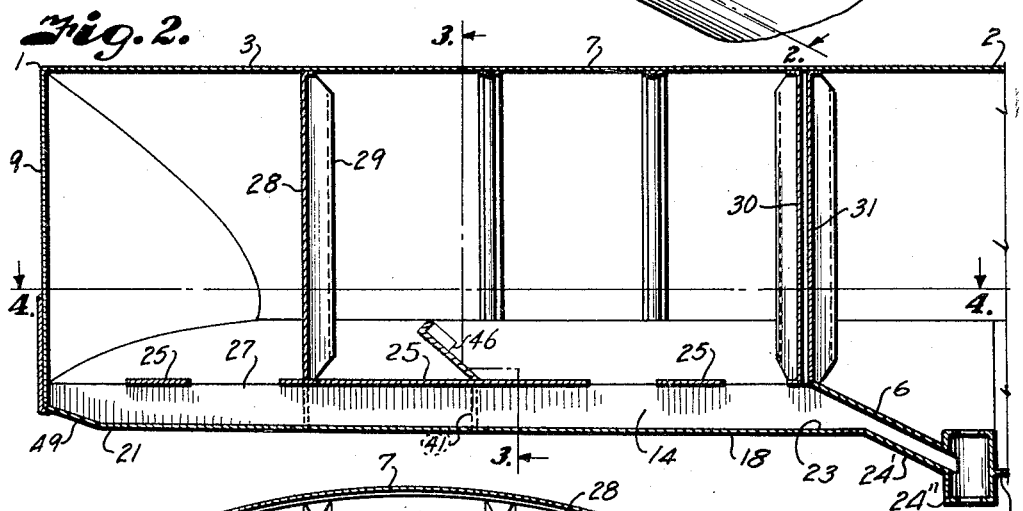
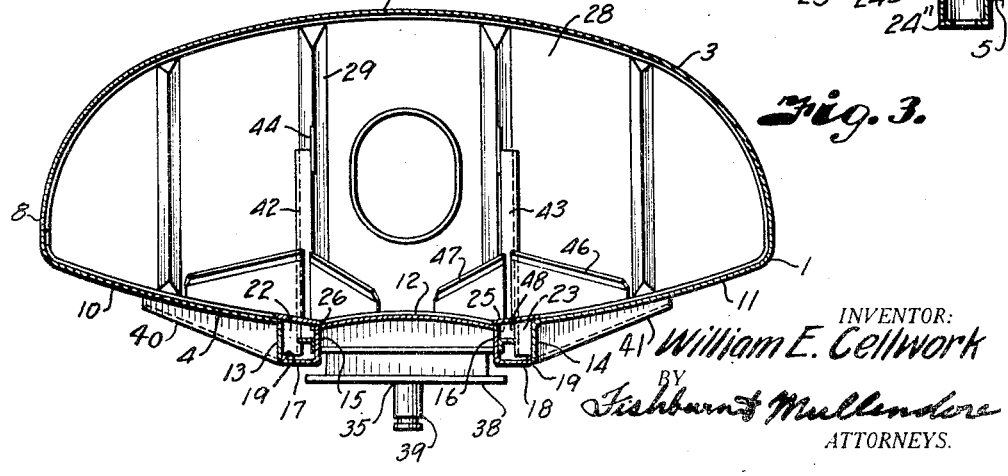
INVENTOR:
William E. Cellwork
BY
Fishburn & Mullendore
ATTORNEYS.

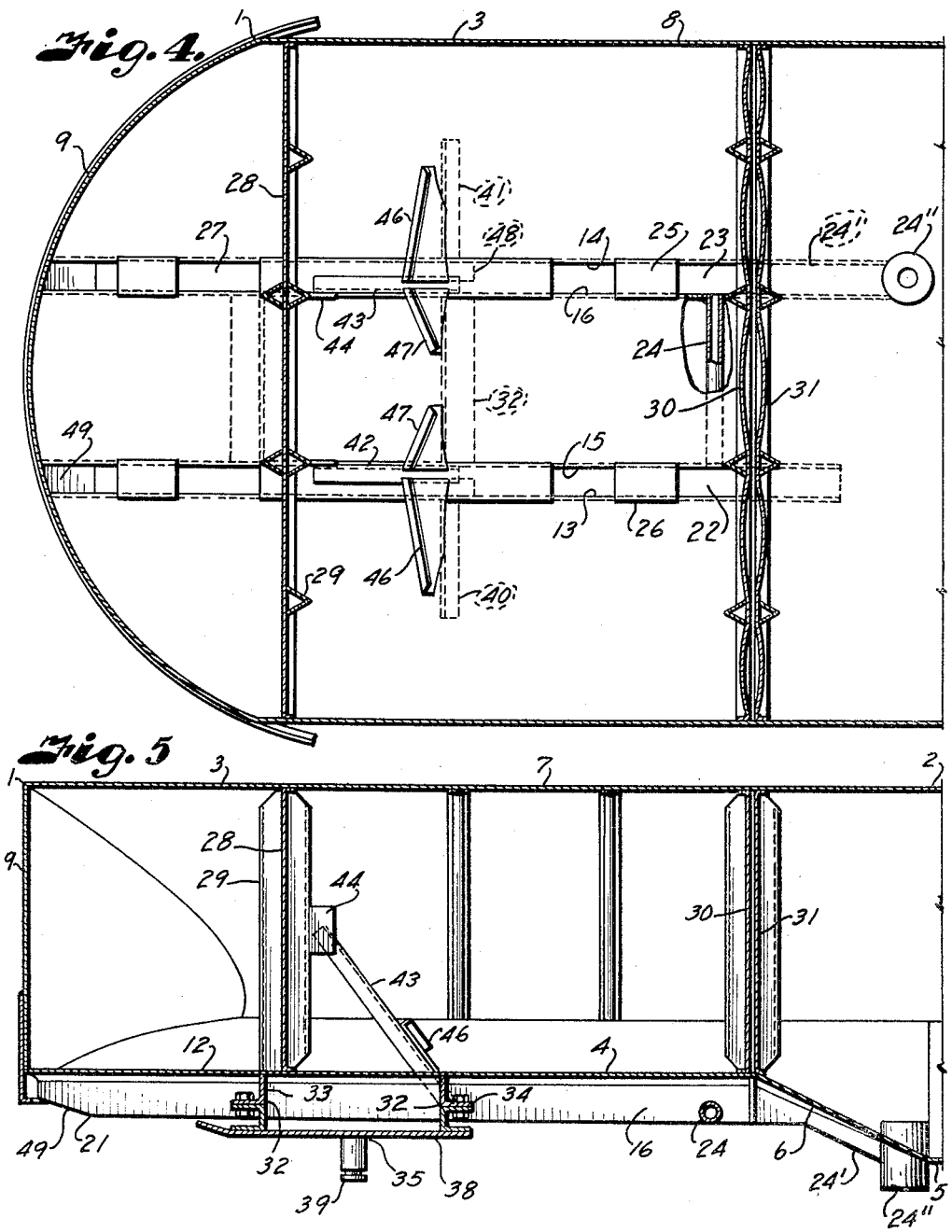

Jan. 2, 1951 W. E. CELLWORK 2,536,263
TUNNEL DRAIN CONSTRUCTION ON SEMITRAILER TANKS
Filed Aug. 21, 1944 3 Sheets-Sheet 3

INVENTOR:
William E. Cellwork
BY Fishburn & Mullendore
ATTORNEYS.

Patented Jan. 2, 1951

2,536,263

UNITED STATES PATENT OFFICE 2,536,263

TUNNEL DRAIN CONSTRUCTION ON SEMITRAILER TANKS

William E. Cellwork, Kansas City, Mo., assignor to Standard Steel Works, North Kansas City, Mo., a corporation of Missouri Application August 21, 1944, Serial No. 550,371

13 Claims. (Cl. 280—5)

1

This invention relates to tanks for hauling liquids and particularly to those known as semitrailer tanks wherein the front of the tank is removably supported upon a tractor vehicle and the rear upon a wheeled unit.

Tanks of this character are usually constructed with a relatively flat and upwardly offset bottom portion at the forward end which is supported upon the tractor vehicle so as to provide a low center of gravity and permit turning of the tractor relative to the trailing unit.

Trailer tanks provide for economical transportation of liquids but it has always been a problem to construct the forward ends of such tanks so as to effect proper drainage of liquid therefrom when the tanks are emptied. This is caused by several factors; for example, welding required in securing the parts of the tank together produces buckles in the relatively flat offset bottom portions of the tanks which must be set down by peaning. The peaning operation tends to reduce the buckles but it results in indentations so that it is practically impossible to avoid some portions from being lower than others.

Another factor in inadequate drainage is that the deformation produced by bumps and knocks during connection and disconnection of the trailer causes pockets to occur which are difficult to drain.

Another factor is the deformation which results from prior inability to provide adequate structural support without further increasing the difficulties resulting from welding operations. When heavy frame members are welded to the bottom of the tank the buckling condition sets up internal stresses which ultimately result in leaks when the metal fails under flexure.

Another disadvantage in use of external members is that they require considerably more space and result in a tank having a high center of gravity for a corresponding capacity. When adequate internal bracing is substituted for the external supports the internal bracing interferes with proper drainage, particularly when the tank is on unlevel ground at the time of unloading.

Therefore, the principal objects of the present invention are to overcome the above difficulties by providing a bottom structure for the forward end of a trailer tank which results in complete drainage even though the tank may be out of level position when unloaded.

Other objects of the invention are to provide a structural support for the bottom of the tank which also serves as a drain duct thereby avoiding additional welding necessary to secure the

2 customary drain ducts; to provide a cleaner under structure for such tanks; to provide a structural support for the bottom of a tank which also serves as a skid for facilitating connection and disconnection of the trailer without hanging up some part of the tank skirting or nose of the tank on the lower fifth wheel member of the tractor vehicle; to provide a stronger, light-weight construction which better retains the shape of the bottom of the tank so as to assure proper drainage throughout the life thereof; and to provide a construction which saves considerable internal reinforcement ordinarily necessary to support the shock load from the fifth wheel of the vehicle and the static load of the liquid in the tank.

In accomplishing these and other objects of the invention, I have provided improved structure, the preferred form of which is illustrated in the accompanying drawings wherein:

Fig. 1 is an underneath perspective view of the under portion of a trailer tank constructed in accordance with the present invention and wherein the forward offset portion contains a compartment separate from the rear of the tank.

Fig. 2 is a longitudinal section through the front of the tank taken on the line 2—2 of Fig. 1.

Fig. 3 is a cross section on the line 3—3 of Fig. 2.

Fig. 4 is a horizontal section on the line 4—4 of Fig. 2.

Fig. 5 is a central longitudinal section through the front of the tank particularly illustrating mounting of the upper member of the fifth wheel on which the forward end of the tank is adapted to be supported.

Figure 6:
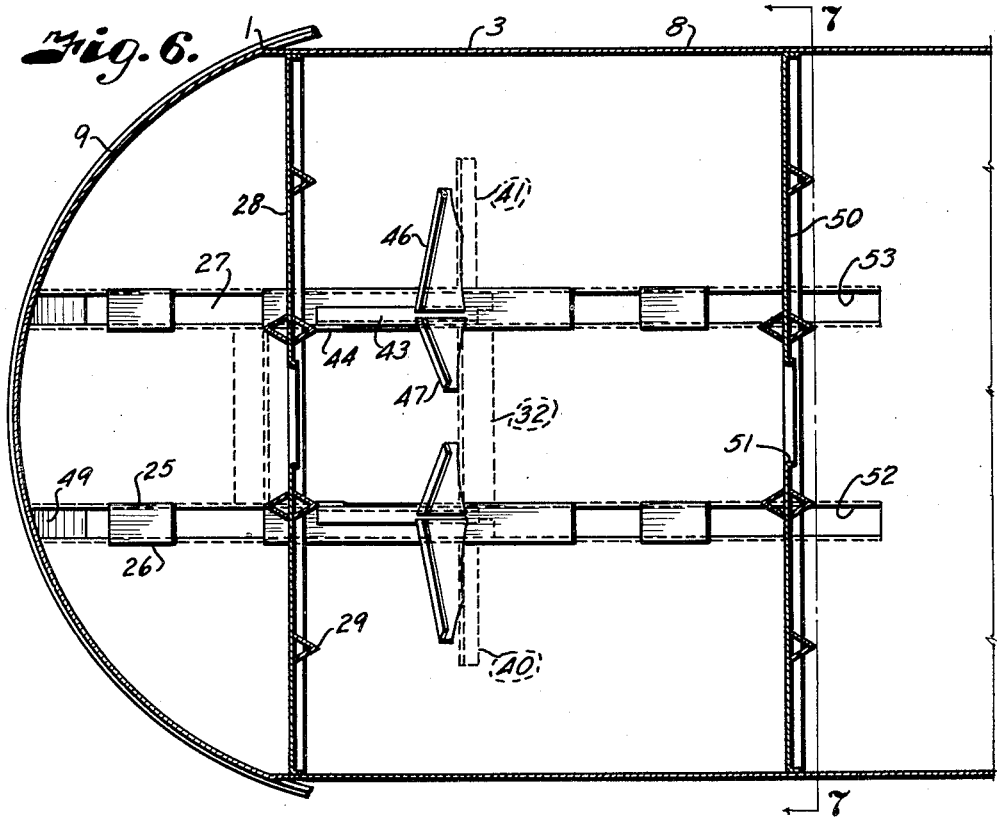
Fig. 6 is a horizontal section through a tank wherein the forward offset and rear portions form a single compartment.

Referring more in detail to the drawings:

I designates a semi-trailer tank having a rear portion 2 of substantially elliptical or other suitable cross section that is supported on a wheeled unit (not shown) as in customary practice. The forward end 3 of the tank has an upwardly offset bottom portion 4 connected with the rounded bottom portion 5 of the elliptical portion of the tank by an incline throat sheet 6. The top 7 and side portions 8 of the tank are preferably continuous throughout the length thereof but the front terminates in a rounded nose 9 so that the forward end of the tank may be positioned relatively close to the cab of the tractor vehicle (not shown) and permit turning of the tractor vehicle.

In the tank illustrated the sides 8 at the forward ends thereof terminate in inwardly and downwardly inclined bottom sections 10 and 11 extending toward each other but spaced apart to accommodate a central section 12 therebetween as best shown in Fig. 3. The terminal ends of the inwardly extending sections 10 and 11 are provided with depending longitudinal flanges 13 and 14 extending from the throat 6 to the forward rounded end of the tank 9. The central section 12 is longitudinally crowned so that the sides slope downwardly and terminate in spaced relation with the flanges 13 and 14 where they are provided with depending flange portions 15 and 16 extending parallel and coextensive with the flanges 13 and 14 and which are connected thereto by laterally extending flanges 17 and 18 on the lower edges thereof. The flanges 17 and 18 have the marginal edges turned upwardly to provide lips 19 so as to facilitate welding of the flanges 13 to the flanges 17 and flanges 14 to the flanges 18. The flanges 15 and 17 also extend from the throat 6 to the forward end 9 of the tank and cooperate with the flanges 13 and 14 to form longitudinal reinforcing members 20 and 21 and to constitute drainage channels 22 and 23. The channels are connected at their rear ends by a pipe or duct 24 having the ends welded in suitable openings of the flanges 15 and 16 whereby liquid in the channel 22 flows into the channel 23. The liquid is then drained from the rear end of the channel 23 through a duct 24' that is attached to the under side of the throat sheet 6 and connects with an emergency valve housing 24" from which the liquid is drained as in usual practice.

In order to reinforce the longitudinal members and to tie the bottom sections 10 and 11 to the central section 12, I provide tie plates 25 which span the channels as shown in Fig. 3, and have their side edges welded to the bottom sections as indicated at 26. The tie plates are spaced along the length of the channels and positioned to support the thrusts acting upon the bottom of the tank, for example, one of the tie plates is preferably located in registry with the point of the fifth wheel attachment as shown in Fig. 5. The adjacent tie plates are spaced therefrom and from the respective ends of the channels to provide inlet openings 27 through which liquid drains from the forward portion of the tank into the drainage channels. The forward portion of the tank may be provided with a transverse surge plate 28 that is located adjacent the forward ends of the central tie plates. The surge plate may be suitably ribbed as indicated at 29 and attached to the walls of the tank in any suitable manner.

The interior of the tank is shown as divided at the upper portion of the throat 6 by partitions or bulkheads 30 and 31 that extend transversely of the tank similarly to the surge plate 28, the surge plates and partitions being suitably attached to the walls and bottom of the tank, for example, by welding. Extending transversely across the bottom of the tank below the central tie plates are angle-shaped girders 32 having horizontal legs 34 for attaching the upper member 35 of the fifth wheel of the tractor vehicle. The plate 38 is provided with a king pin 39 adapted to engage in a socket of the lower member of the fifth wheel (not shown).

The bottom of the tank is preferably reinforced at points adjacent the ends of the rearmost girder 32 by angle plates 40 and 41 extending laterally from the flanges 13 and 15 as best illustrated in Figs. 1, 3, and 4. The rear girder member is also preferably connected with the forward surge plate by brace arms 42 and 43 having their upper ends connected to gusset plates 44 extending rearwardly from rib-like reinforcing members 29 that extend vertically of the surge plates. The lower ends of the braces may extend through the central tie plates and are preferably welded to the portions 15 and 16 as best shown in Fig. 3. The arms are also preferably braced in a lateral direction by plates 46 and 47 having their lower edges attached to the bottom portions 10, 11, and 12 of the tank at points directly above the rear girder 32 and the angle plates 40 and 41. Portions 48 of the plates 46 extend into the channels and are secured to the depending flanges 13 and 14 and also to the adjacent ends of the brace arms. The portions 48, however, terminate short of the bottoms of the channels to provide drainage space thereunder.

The forward ends of the channels are inclined upwardly as indicated at 49 to raise and guide the front of the trailer when the tractor vehicle is moved thereunder to connect with the trailer.

It is obvious that the tank bottom constructed as described is divided into a plurality of relatively short but relatively sharp slopes, for example, the outer sections slope from the side walls of the tank to the drainage channels and the central section of the bottom slopes laterally in both directions to the drainage channel to assure adequate drainage into the channels regardless of ordinary unlevel positions of the tank when it is being unloaded.

It is also obvious that the drainage channels provide box-like reinforcing members which are of relatively light-weight but strong construction and capable of supporting the static load of the liquid in the tank as well as the thrusts on the bottom of the tank through the draft forces and shock loads acting through the fifth wheel mounting of the tank.

The structure also provides a relatively clean bottom having a minimum of projections that are apt to hang up on the fifth wheel mounting and there are no drainage pipes that are apt to be torn loose when the tank is being connected or disconnected from the tractor vehicle.

The structure also provides for a minimum amount of internal bracing so that the whole results in a light-weight, strong construction having a greater load capacity and which provides a low center of gravity since the bottom of the tank may be located in close relation with the tractor vehicle.

Figure 7:
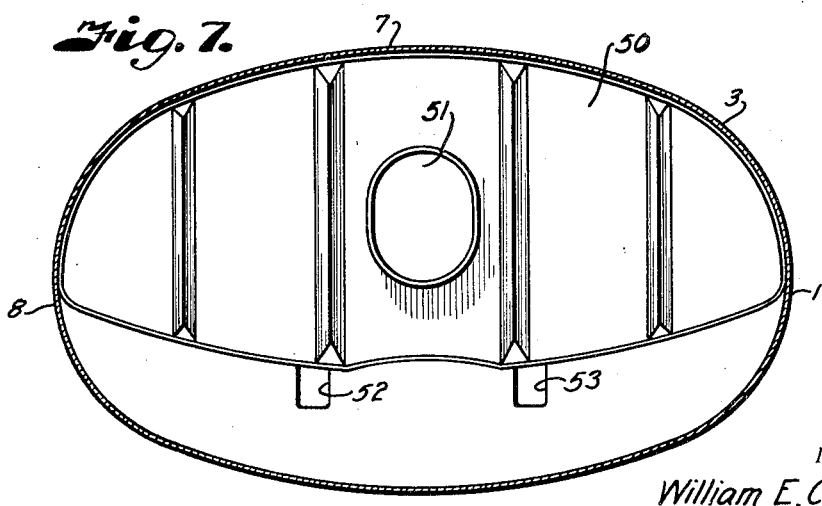
Fig. 7 is a cross section on the line 7—7 of Fig. 6 particularly illustrating the outlet ports of the drainage duct for the offset portion of the tank.

The tank illustrated in Figs. 6 and 7 is similar to that just described except that the forward compartment connects with the compartmental portion above the throat sheet. In this instance the partition 50 at the rear of the channels is merely a surge plate and like the front surge plate has an opening 51 therethrough. The channels, therefore, discharge through openings 52 and 53 in the throat sheet whereby the liquid drains from the offset bottom into the flow channels and through the flow channels to the rear portion of the tank through the openings 52 and 53.

What I claim and desire to secure by Letters Patent is:

1. A trailer tank of the character described having a forward portion provided with an upwardly offset bottom having a central section provided with a central upwardly extending longitudinal crown and downwardly sloping side edges, side sections sloping downwardly from sides of the tank in the direction of the side edges of the central section and spaced therefrom to provide drainage openings, channel-shaped duct members connected with said sections and depending from said bottom substantially coextensive with said drainage openings, and tie members spanning said channel-shaped duct members and connecting said central and side sections of said offset bottom, said tie members being spaced along the length of said channel-shaped duct members.

2. A trailer tank of the character described having a forward portion provided with an upwardly offset bottom including a central bottom section having a central section provided with a central upwardly extending longitudinal crown and downwardly sloping side edges, side sections sloping downwardly in the direction of the side edges of the central section and spaced therefrom to provide drainage openings, channel-shaped duct members connected with said sections and depending from said bottom substantially coextensive with said drainage openings, tie members spanning said channel-shaped duct members and connecting said central and side sections of said offset bottom along the length of said channel-shaped duct members, and girders extending transversely below said central section and having ends connected to said channel-shaped duct members.

3. A trailer tank of the character described having a forward portion provided with an upwardly offset bottom from the rest of the tank including a central bottom section provided with a central crown and downwardly sloping side edges, side sections sloping in the direction of the side edges of the central section and spaced therefrom to provide drainage openings, channel-shaped duct members connected with said sections and depending from said bottom substantially coextensive with the drainage openings, tie members spanning said channel-shaped duct members and connecting said central and side sections of the bottom, said tie members being spaced along the length of said channel-shaped duct members, girders extending transversely below said central bottom section and having ends connected to said channel-shaped duct members, a surge plate extending transversely within said forward portion of the tank in substantial alignment with one of said girders and having connection with said bottom sections, and brace means connecting said surge plate with the other of said girders.

4. A trailer tank of the character described having a forward portion provided with an upwardly offset bottom including a central bottom section having crown and downwardly sloping side edges, side sections sloping in the direction of the side edges of the central section and spaced therefrom to provide drainage openings, channel-shaped duct members connected with said sections and depending from said offset bottom substantially coextensive with the drainage openings, a transverse duct connecting the rear end of said channel-shaped duct members, tie members spanning said channel-shaped duct members and connecting said central and side sections of the bottom spaced along the length of said channel-shaped duct members, girders extending transversely below said central bottom section and having ends connected to said channel-shaped duct members, a surge plate extending transversely within said offset portion above one of said girders and having connection with said bottom sections, brace means connecting said surge plate with the other of said girders, and gusset plates connecting said brace means with said central and bottom sections on the respective sides of said duct members.

5. A trailer tank having a forward portion provided with an offset bottom including a central longitudinal bottom section having a central crown sloping downwardly toward side edges of said section, side sections having inner side edges spaced from and substantially coextensive in length with adjacent side edges of the central section, channel-shaped ducts depending from said bottom and forming a connection between said side sections, longitudinal tie plates bridging the spaces between the said central bottom section and the side sections, a transverse member extending within the tank at forward ends of said longitudinal tie members, transverse girders below said sections and having ends connected with said ducts adjacent ends of the longitudinal tie plates, brace means connected with the transverse member, gusset plates connecting the brace means with said bottom and having connection with sides of said ducts, and additional tie plates spaced from the ends of the longitudinal tie plates.

6. A trailer tank having a forward portion provided with an offset bottom including a central longitudinal bottom section having a central longitudinal crown sloping downwardly toward side edges of said section, side sections coextensive with the central section and having inner side edges spaced from and substantially coextensive in length with adjacent side edges of the central section, substantially parallel channel-shaped ducts depending from said bottom and forming a connection between the edges of said central and side sections, longitudinal tie plates bridging the spaces between the said sections, a transverse member extending within the tank at forward ends of said longitudinal tie plates, transverse girders below said sections and having ends connected with said ducts at points adjacent ends of the longitudinal tie plates, brace means connecting the transverse member with said bottom adjacent the transverse girder adjacent the rear ends of the tie plates, gusset plates connecting the brace means with said bottom, girder extensions under said side sections and having connection with sides of said ducts, and tie plates spaced from the ends of the longitudinal tie plates.

7. A trailer tank of the character described having an upwardly offset bottom including a central section, side sections having edges spaced from adjacent edges of the central section to provide drainage openings, and channel-shaped skids, having side flanges directly connected with said spaced edges of said sections at the respective sides of said drainage openings.

8. A trailer tank of the character described having a forward portion provided with an upwardly offset bottom including a central section provided with a central upwardly facing crown and downwardly sloping side portions, side sections sloping toward the side portions of the central section and spaced therefrom to provide drainage openings, and channel-shaped skids having side portions connected with the sections along the drainage openings for forming ducts to drain said forward portion.

9. A trailer tank of the character described having a forward portion provided with an upwardly offset bottom including a central section provided with a central crown and downwardly sloping side portions terminating in depending flanges, side sections sloping in the direction of the side portions of the central section and spaced therefrom to provide drainage openings and having depending flanges, cooperating with the flanges on the central section for forming the side portions of channel-shaped ducts, bottoms connecting the cooperating flanges to provide skids for said forward portion, and tie members spaced along the length of said channel-shaped duct members and connecting the side and central sections across openings.

10. A trailer tank of the character described having an upwardly offset bottom including a central section, side sections having edge portions spaced from adjacent edge portions of the central section to provide drainage openings therebetween, channel-shaped duct members having flanges connected to said edge portions at the respective sides of said drainage openings and arranged coextensive with said edge portions below said sections, said channel-shaped duct members having rear ends discharging into a portion of the tank rearwardly of said offset bottom, and having forward ends forming skids.

11. A trailer tank of the character described having a forward portion provided with an upwardly offset bottom including a central section, side sections having edges spaced from adjacent edges of the central section to provide drainage openings therebetween coextensive with said sections, channel-shaped duct members connected to said edges at the respective sides of said drainage openings and arranged coextensive with said edge portions below the upper surfaces of said sections, and spaced girders extending transversely of the central sections and having ends terminating in connection with sides of said channel-shaped duct members, said channel-shaped duct members having rear ends discharging into a portion of the tank to the rear of said forward portion and having forward ends of skid-shape.

12. In a trailer tank of the character described having an upwardly offset bottom in a forward portion of said tank, laterally spaced longitudinal ducts connected with said offset bottom for draining said forward portion of the tank, and a transverse duct connecting rear ends of the longitudinal ducts, one of said longitudinal ducts having an outlet into a portion of said tank rearwardly of said forward portion.

13. A trailer tank of the character described having an upwardly offset bottom including a central section, side sections disposed on opposite sides of the central section and having inner edge portions spaced from and substantially coextensive in length with adjacent edge portions of the central section to provide drainage openings therebetween, and channel-shaped duct members having flanges connected to said edge portions at the respective sides of the drainage openings and arranged coextensive with the sides of said sections and depending below said offset bottom to provide longitudinal reinforcing means for said offset bottom.

WILLIAM E. CELLWORK.

REFERENCES CITED

The following references are of record in the file of this patent:

UNITED STATES PATENTS

| Number | Name | Date |
|---|---|---|
| 1,422,107 | Kramer | July 11, 1922 |
| 1,815,625 | Kramer | July 21, 1931 |
| 1,886,197 | Kramer | Nov. 1, 1932 |
| 1,902,849 | Gredell | Mar. 28, 1933 |
| 2,041,320 | Bradley et al. | May 19, 1936 |
| 2,160,477 | Kramer | May 30, 1939 |
| 2,169,500 | Reid | Aug. 15, 1939 |
| 2,223,571 | Meyer | Dec. 3, 1940 |
| 2,239,442 | Gredell | Apr. 22, 1941 |